United States Patent Office 3,227,736
Patented Jan. 4, 1966

---

3,227,736
PRODUCTION OF α-FLUOROCARBOXYLIC
ACIDS AND ESTERS
Rudolf Tschesche, Bonn-Rottgen, and Hans Machleidt, Bonn, Germany, assignors to Olin Mathieson Chemical Corporation, New York, N.Y., a corporation of Virginia
No Drawing. Filed Oct. 31, 1962, Ser. No. 234,524
10 Claims. (Cl. 260—405.5)

This invention relates to the production of α-fluoro substituted carboxylic acids and esters.

Aliphatic α-fluorocarboxylic acid esters are difficult to obtain by conventional methods especially in good yield. It has now been found that such esters may be readily produced in good yield from α-fluoro-β-ketocarboxylic acid esters in alcoholic solution in the presence of catalytic amounts of strong bases. Since the α-fluoro-β-ketocarboxylic acid esters are easily obtained by the reaction of α-substituted-β-ketoesters with perchloryl fluoride in the presence of a strong base, such as sodium ethoxide, potassium t-butoxide and the like, this process has particular advantage.

This invention is applicable to the conversion of aliphatic esters of Formula Ia to products of Formula IIa or to the conversion of cyclic esters of Formula Ib to products of Formula IIb as follows:

$$R_1-\underset{\underset{COOR_2}{|}}{\overset{\overset{F}{|}}{C}}-\overset{\overset{R}{|}}{C}=O \longrightarrow R_1-\underset{\underset{COOR_2}{|}}{\overset{}{CH}}-F$$

(Ia) (IIa)

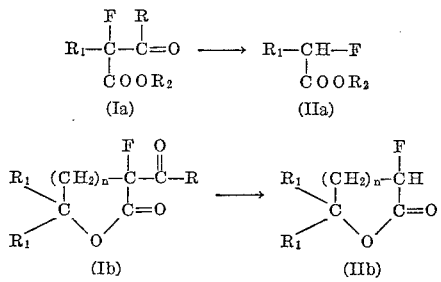

(Ib) (IIb)

In the above formulas R represents lower alkyl, carbocyclic aryl or carbocyclic aralkyl. $R_1$ represents alkyl, alkenyl or carbocyclic aryl, carbocyclic aralkyl, or carbocyclic aralkenyl, each of which may contain a functional group such as hydroxy, acyloxy, carbonyl or carbalkoxy. $R_2$ represents lower alkyl. The symbol $n$ represents 1 or 2.

Alkyl groups included in the symbols (including the alkyl moiety of the aralkyl and carbalkoxy groups) are straight or branched chain saturated aliphatic groups having up to about 18 carbon atoms, e.g. methyl, ethyl, propyl, isopropyl, butyl, amyl, isoamyl, hexyl, octyl, stearyl, palmithyl and the like, the lower alkyl groups being preferred. The alkenyl groups are monounsaturated aliphatic groups of the same character. Carbocyclic aryl groups include for example, phenyl, o-tolyl, p-carbethoxyphenyl, m-acetylphenyl and the like. The aralkyl and aralkenyl groups are preferably phenyl substituted alkyl and alkenyl groups of the type described.

The conversion of compounds of the formulas Ia and Ib to the respective products IIa and IIb is effected in alcoholic solution, e.g. a lower alkanol such as methanol, ethanol or the like, in the presence of a strong base such as alkali metal alkanoate, e.g. sodium methoxide, sodium ethoxide or the like. Catalytic amounts of bases e.g. about 0.01 to 0.5, preferably about 0.1 to 0.2, molar equivalents of base in relation to keto ester, are sufficient to provide good yields. The mixture may be heated to accelerate the reaction if desired; a temperature up to reflux temperature may be used.

If, however, the fluorination of the α-substituted-β-ketocarboxylic acid ester, from which the compounds Ia and Ib are derived, are treated with the perchoryl fluoride (in about equimolecular proportion) in the presence of an excess of the strong base referred to above at a temperature between 40° and 80° C., then the products IIa and IIb are obtained directly.

The ester serves as an intermediate for the corresponding α-fluorinated acid to which it may be converted by hydrolysis with an alkali metal hydroxide such as sodium hydroxide or alkaline earth metal hydroxide.

The α-fluorocarboxylic acids are physiologically active substances useful as anti-metabolites in that they are orally effective hypocholesteremic agents which inhibit the biosynthesis of cholesterol and regulate the level of cholesterol in the blood being useful in the treatment of atherosclerosis and similar conditions involving excess of cholesterol.

The following examples are illustrative of this invention. All temperatures are expressed on the centigrade scale.

EXAMPLE 1

*2-fluoro-5-methylhexanoic acid ethyl ester*

23.2 grams of α-fluoro-α-isoamyl-acetoacetic acid ethyl ester in a solution of 0.5 grams of sodium in 100 ml. of absolute ethanol are refluxed for three hours. After the solution has cooled and water has been added, the neutral fraction is extracted several times with petroleum ether. The combined petroleum ether phases yield, after washing with some water, distilling off the solvent and distilling the remaining oil, in vacuo, 12.3 grams (67%) of 2-fluoro-5-methylhexanoic acid ester, B.P.$_{12}$ 79–80°.

Calcd. for $C_9H_{17}FO_2$ (176.8): C, 61.4; H, 9.72. Found: C, 61.29; H, 9.65.

EXAMPLE 2

*2-fluoro-5-methylhexanoic acid*

55 grams of 2-fluoro-5-methylhexanoic acid ethyl ester are refluxed with a solution of 12.1 grams of sodium hydroxide in 1 liter of methanol and water at the ratio of 1:1 for five hours. After cooling, distilling off the methanol in vacuo and the addition of sulfuric acid, the organic acid is extracted several times with petroleum ether. The combined petroleum ether phases yield, after distilling off the solvent and distilling the residue in vacuo, 28.2 grams (61%) of crystalline 2-fluoro-5-methylhexanoic acid, B.P.$_{11}$ 115°. Recrystallized from the petroleum ether, long leaflets, M.P. 47–48°, are obtained.

Calcd. for $C_7H_{13}FO_2$ (148.2): C, 56.72; H, 8.84; F, 12.86. Found: C, 56.60; H, 9.03; F, 12.66.

EXAMPLE 3

*2-fluoro-5-methyl-4-hexenoic acid ethyl ester*

A. 80.5 grams of α-fluoro-α-(3-methyl-2-butenyl) acetoacetic acid ethyl ester are refluxed with a solution of 500 mg. of sodium in 250 ml. of absolute ethanol for two hours. After cooling and the addition of an equal volume of water to the solution, the neutral fraction is extracted several times with petroleum ether. After washing of the combined petroleum ether phases, drying over magnesium sulfate and distilling off the solvent, the residue yields, when distilled in vacuo, 65.2 grams (85%) of 2-fluoro-5-methyl-4-hexenoic acid ethyl ester, B.P.$_{12}$ 84–87°.

Calcd. for $C_9H_{15}FO_2$ (174.2): C, 62.04; H, 8;68. Found: C, 62.02; H, 8.68.

B. 168 grams (1 mol) of α-(3-methyl-2-butenyl) acetoacetic acid ethyl ester are dropped, with cooling, into a solution of 27.6 grams of sodium (1.2 gram-atom) in 800 ml. of absolute ethanol and then 102 grams (1 mol) of perchloryl fluoride are added, with stirring, at 30–40°. Separation of sodium chlorate occurs immediately. After heating to 50° for three hours, the solution is separated from the sodium chlorate by filtering under suction, concentrated to about 300 ml. in vacuo and, after 400 ml. of water have been added, the neutral fraction is extracted several times with chloroform. After washing the combined chloroform phases with water, drying and distilling off the solvent, fractional distillation of the residue yields 125 grams (72%) of 2-fluoro-5-methyl-4-hexenoic acid ethyl ester, B.P.$_{12}$ 87°. This is gas-chromatographically identical with the preceding product.

EXAMPLE 4

*2-fluoro-5-methyl-4-hexenoic acid*

30 grams of 2-fluoro-5-methyl-4-hexenoic acid ethyl ester are refluxed with a solution of 8.25 grams of sodium hydroxide in 400 ml. of methanol and water at the ratio 1:1 for three hours. After distilling off the methanol in vacuo and adding sulfuric acid, the organic acid is isolated by extraction with chloroform. The residue obtained after distilling off the solvent yields, when distilled in vacuo, 21.7 grams (86%) of crystalline 2-fluoro-5-methyl-4-hexenoic acid, B.P.$_{.01}$ 65°. Recrystallized from the petroleum ether, long leaflets of M.P. 34–35° are obtained.

Calcd. for $C_7H_{11}FO_2$ (146.2): C, 57.48; H, 7.57. Found: C, 56.99; H, 7.44.

EXAMPLE 5

*2-fluoro-5,9-dimethyl-8-decenoic acid, ethyl ester*

85.0 grams of α-fluoro-α-(3,7-dimethyl-6-octenyl) acetoacetic acid ethyl ester are refluxed with a solution of 500 mg. of sodium in 300 ml. of absolute ethanol for three hours. After cooling and adding 300 ml. of water, the neutral fraction is extracted several times with petroleum ether. The combined petroleum ether phases yield, after washing, drying, distilling off the solvent and distilling of the residue in vacuo, 63 grams (87%) of 2-fluoro-5,9-dimethyl-8-decenoic acid ethyl ester, B.P.$_{.0.05}$ 70–74°.

Calcd. for $C_{14}H_{25}FO_2$ (244.3): C, 68.82; H, 10.32. Found: C, 68.98; H, 10.03.

EXAMPLE 6

*α-Fluoro-γ-butyrolactone*

73.5 grams of α-fluoro-α-acetyl-γ-butyrolactone are refluxed with a solution of 1.16 grams of sodium in 200 ml. of absolute ethanol for one hour. After cooling, 300 ml. of water are added and the lactone is extracted with chloroform several times. After washing the combined chloroform phases in some water, drying and dissilling off the solvent, an oil remains, which, after vacuum distillation yields 37.2 grams (71%) of α-fluoro-γ-butyrolactone, B.P.$_{.12}$ 114°.

Calcd. for $C_4H_5FO_2$ (104.1): C, 45.98; H, 4.81. Found: C, 45.68; H, 4.89.

EXAMPLE 7

*α-Fluorosuccinic acid diethyl ester*

63 grams of α-fluoro-α-acetylsuccinic acid diethyl ester are refluxed with a solution of 1.5 grams of sodium in 300 ml. of absolute ethanol for one hour. After cooling and adding 300 ml. of water the fluorinated ester is extracted several times with chloroform. After washing the combined chloroform phases with water, drying over MgSO$_4$ and distilling off the solvent, distillation of the residue yields 32.2 grams (62%) of a α-fluorosuccinic acid diethyl ester, B.P.$_{.0.05}$ 70°.

Calcd. for $C_8H_{13}FO_4$ (192.2): C, 50.01; H, 6.82. Found: C, 50.23; H, 6.98.

What is claimed is:

1. A process for the production of compounds of the formula

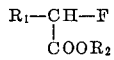

wherein $R_1$ is a member of the group consisting of alkyl, alkenyl, carbocyclic aryl, carbocyclic aralkyl and carbocyclic aralkenyl, and $R_2$ is lower alkyl, which comprises treating a compound of the formula

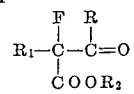

wherein $R_1$ and $R_2$ are as above defined and R is a member of the group consisting of alkyl, carbocyclic aryl and carbocyclic aralkyl, with a catalytic amount of strong base in lower alkanol solution up to reflux temperature.

2. A process as in claim 1 wherein the base is alkali metal lower alkanolate.

3. A process as in claim 1 wherein the base is sodium ethoxide and the alkanol is ethanol.

4. A process for the production of α-fluoroalkanoic acid alkyl esters which comprises reacting α-fluoro-β-ketoalkanoic acid alkyl ester with a catalytic amount of alkali metal lower alkanolate in lower alkanol up to reflux temperature.

5. A process as in claim 4 wherein the α-fluoroalkanoic acid alkyl ester is converted to the corresponding α-fluoroalkanoic acid by saponification with alkali metal hydroxide.

6. A process for the production of a compound of the formula

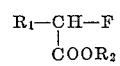

wherein $R_1$ is a member of the group consisting of alkyl, alkenyl, carbocyclic aryl, carbocyclic aralkyl and carbocyclic aralkenyl, and $R_2$ is lower alkyl which comprises reacting a compound of the formula

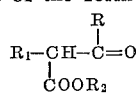

wherein $R_1$ and $R_2$ are as above defined and R is a member of the group consisting of alkyl, carbocyclic aryl and carbocyclic aralkyl, with perchloryl fluoride in excess alkali metal lower alkanolate at a temperature of about 40° to about 80° C.

7. A process as in claim 6 wherein the alkanolate is sodium ethoxide.

8. A process for the production of 2-fluoro-5-methylhexanoic acid ethyl ester which comprises heating α-fluoro-α-isoamylacetoacetic acid ethyl ester with sodium ethoxide in ethanol.

9. A process for the production of 2-fluoro-5-methyl-4-hexenoic acid ethyl ester which comprises heating α-fluoro-α-(3-methyl-2-butenyl) acetoacetic acid ethyl ester with sodium ethoxide in ethanol.

10. A process for the production of 2-fluoro-5,9-dimethyl-8-decenoic acid ethyl ester which comprises heating α-fluoro-α-(3,7-dimethyl-6-octenyl)acetoacetic acid ethyl ester with sodium ethoxide in ethanol.

References Cited by the Examiner

UNITED STATES PATENTS

| | | | |
|---|---|---|---|
| 2,638,479 | 5/1953 | Ballard et al. | 260—468 |
| 2,648,702 | 8/1953 | DeGarmo et al. | 260—476 |
| 2,852,530 | 9/1958 | Ford | 260—343.6 |
| 2,929,835 | 3/1960 | Hayes et al. | 260—486 |
| 2,983,751 | 5/1961 | Braumworth | 260—487 |
| 3,014,925 | 12/1961 | Linn et al. | 260—343.5 |

WALTER A. MODANCE, *Primary Examiner.*

DUVAL T. McCUTCHEN, *Examiner.*